(12) United States Patent
Bolan et al.

(10) Patent No.: US 7,574,534 B2
(45) Date of Patent: Aug. 11, 2009

(54) METHOD FOR USING DEVICE ENUMERATION INFORMATION TO IDENTIFY AN OPERATING SYSTEM RUNNING ON A COMPUTER SYSTEM

(75) Inventors: Joseph E. Bolan, Cary, NC (US); Robert K. Christner, Raleigh, NC (US); Simon C. Chu, Chapel Hill, NC (US); Peter T. Donovan, Cary, NC (US); Eric R. Kern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 11/419,988

(22) Filed: May 23, 2006

(65) Prior Publication Data

US 2008/0005370 A1 Jan. 3, 2008

(51) Int. Cl.
*G06F 3/00* (2006.01)
*G06F 9/00* (2006.01)

(52) U.S. Cl. .................. 710/15; 710/8; 710/10; 713/1; 713/2

(58) Field of Classification Search .................. 710/15, 710/8, 10; 713/1, 2
See application file for complete search history.

(56) References Cited

U.S. PATENT DOCUMENTS

| 6,816,897 | B2 | 11/2004 | McGuire |
| 6,909,423 | B2 | 6/2005 | Wu et al. .................. 345/168 |
| 2003/0079119 | A1 | 4/2003 | LeFevre et al. ............. 713/1 |
| 2005/0027900 | A1 | 2/2005 | Pettey ...................... 710/22 |
| 2006/0242401 | A1* | 10/2006 | Elliger et al. .............. 713/2 |
| 2007/0005866 | A1* | 1/2007 | Pike et al. ............... 710/306 |

* cited by examiner

*Primary Examiner*—Niketa I Patel
(74) *Attorney, Agent, or Firm*—Sawyer Law Group LLP

(57) ABSTRACT

Identifying an operating system running on a computer system. In one aspect of the invention, an enumeration pattern is collected, the enumeration pattern describing an enumeration of a device that has been performed between the device and the operating system running on a host computer system. The type of the operating system running on the host computer system is identified based on the collected enumeration pattern.

11 Claims, 4 Drawing Sheets

METHOD FOR USING DEVICE ENUMERATION INFORMATION TO IDENTIFY AN OPERATING SYSTEM RUNNING ON A COMPUTER SYSTEM

FIELD OF THE INVENTION

The present invention relates to computer operating systems, and more particularly to identifying types of operating systems based on enumeration of a device.

BACKGROUND OF THE INVENTION

Operating systems run on host computer systems and communicate with devices using any of a variety of protocols and communication standards. The operating system implements drivers that allow it to send or receive data from a connected device. The communication between device and host can include enumeration, which is the identification of connected devices to the computer system and initialization of the required drivers that enable the device to function with the host computer. In some cases, a device may need to know the identity (i.e., type) of the operating system running on the host computer to which it is connected.

One such instance can occur when a device needs to run a particular program for the host computer system that is dependent on the type of operating system running on that host. For example, a storage device connected to a host computer system might store different versions of an update program for updating a program or flash memory of the host. One of the versions of the update program needs to be run on the device (or provided to the host to be run) to perform the update, where the version to be run is based on the type of operating system running on the host. For example, a first version is executed if the host is running a LINUX® operating system, while a second version is executed if the host is running a WINDOWS® operating system from Microsoft Corp. In a different embodiment, a device may need to know the identity of the operating system to perform a task for the user, such as communicate with the developer of the operating system or perform functions specific to a particular operating system.

In another example, some server systems can include multiple individual server computers, where each server is connected to a central system or set of hardware. For example, one type of server system is a "blade" server such as available from IBM Corporation, and is a system having a chassis or enclosure shared by several servers. Each server is provided as a minimally-packaged computer motherboard "blade" that includes its own processor(s), memory, and other components. System management hardware can control system devices and resources available to any of the blades, including a shared CD device, keyboard and mouse devices, and other resources. Each blade can run its own operating system, and in many cases different operating systems are operating on different blades within a blade server. Software applications running on a blade, launched by management hardware, may need to know the identity of the particular operating system running on a blade. For example, UpdateXpress is an application available from IBM Corporation which updates server firmware and the firmware of supported options provided within a server blade. This application needs to know the type of operating system running on the blade so that the proper updates can be performed. These kinds of applications may request operating system information through the system management hardware.

Existing techniques for identifying an operating system are time consuming or labor intensive. For example, a user is typically required to manually identify the operating system running and indicate that operating system to a device, program, or management hardware. Since there is no existing standard for signals or codes that identify an operating system, there is no automatic detection of operating system type. Software can be provided to run under each operating system and identify the operating system to a requesting device or application, but such software is not provided on most systems.

Accordingly, what is needed is the ability to identify the operating system running on a server or other computer system, without requiring special software running under each operating system or manual identification by a user. The present invention addresses such a need.

SUMMARY OF THE INVENTION

The invention of the present application relates to identifying an operating system running on a computer system using device enumeration. In one aspect of the invention, a method for identifying an operating system running on a computer includes collecting an enumeration pattern describing an enumeration of a device that has been performed between the device and the operating system running on a host computer system, and identifying the type of the operating system running on the host computer system based on the collected enumeration pattern. A similar aspect of the invention is provided for a computer program product comprising a computer readable medium including program instructions for implementing similar features.

In another aspect of the invention, an apparatus for identifying an operating system running on a computer includes a device interface operative to perform an enumeration of a device for the operating system running on a host computer system in communication with the device, and an operating system detection engine in communication with the device interface and operative to receive from the device interface an enumeration pattern describing the enumeration. The operating system detection engine is operative to identify the type of operating system running on the host computer system based on the received enumeration information.

The present invention provides a method and apparatus allowing the operating system of a computer to be automatically identified by a system including a device, thus saving the user the manual tasks of identifying operating systems to connected devices or programs. The present invention also allows operating system identification without having to install specialized and invasive software to run on the computer system and operating system.

DETAILED DESCRIPTION

The present invention relates to computer operating systems, and more particularly to identifying types of operating systems based on enumeration of a device. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

The invention can take the form of an entirely hardware embodiment, an entirely software embodiment or an embodiment containing both hardware and software elements. A software embodiment can include but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

To more particularly describe the features of the present invention, please refer to FIGS. 1-4 in conjunction with the discussion below.

Figure 1:
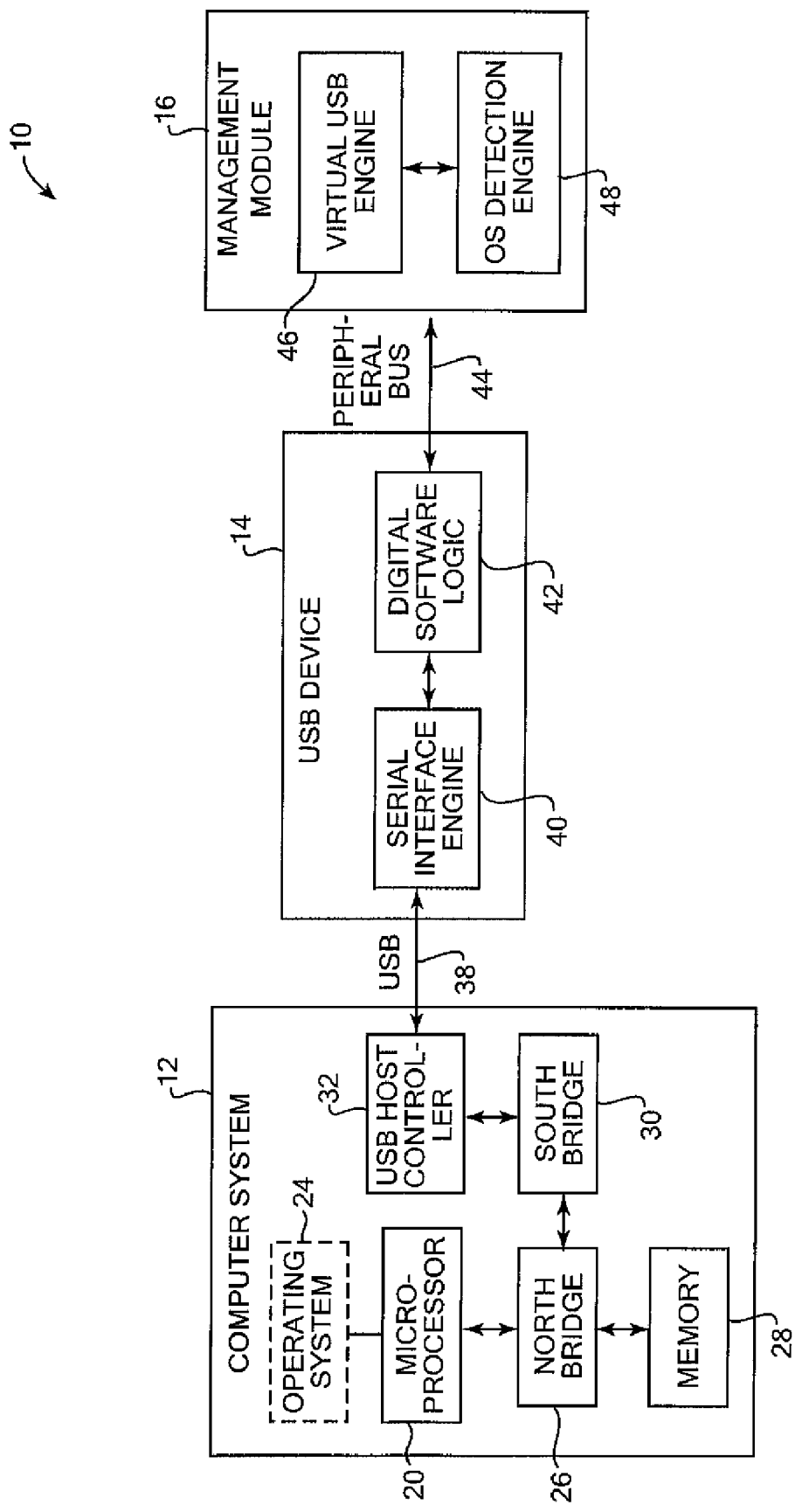
FIG. 1 is a block diagram illustrating a system suitable for use with the present invention.

FIG. 1 is a block diagram illustrating a system 10 suitable for use with the present invention. System 10 includes a computer system 12, a device 14, and a management module 16.

Computer system 12 can be any suitable computer system, server, or electronic device. For example, the computer system 12 can be a mainframe computer, desktop computer, workstation, portable computer, or electronic device (cell phone, personal digital assistant, audio player, game device, etc.). In some embodiments, multiple computer systems 12 are provided to connect to one or more devices 14 (for example, the embodiment of FIG. 2 described below).

Computer system 12 includes one or more microprocessors 20 to execute program code and control basic operations of the computer system 12, including processing operations, manipulating data, issuing commands to other components of the system 12, etc. An operating system 24 runs on the computer system 12 and is implemented by the microprocessor 20 and other components of the computer system 12. The operating system is software running on the microprocessor 20 that performs basic tasks, including input/output operations to I/O devices, controlling and implementing usage of storage devices, and maintaining the operating environment for other programs. The operating system can be one of many different types. For example, common operating system types include LINUX®, UNIX®, WINDOWS® operating systems from Microsoft Corp., and MACOS® from Apple Computer, Inc. For purposes of the present invention, a Basic Input/Output System (BIOS), which can run from power-on and boot-up of a computer system, is also considered an "operating system" that can run on a computer system in addition to another operating system.

One task of the operating system 24 relevant to the present invention is communication with one or more devices 14. Device 14 can include any peripheral, card, or interface device that performs a function and communicates with the computer system 12 and operating system 24, typically using a standard communication protocol. For example, Universal Serial Bus (USB) devices communicate with the computer system using the USB communication standard. The embodiment of FIG. 1 is described with reference to USB devices and the USB standard; however, in other embodiments, other types of devices and communication protocols can be used with the present invention. Other device protocols include Small Computer System Interface (SCSI), Peripheral Interface Connect (PCI and PCI Express), Firewire, parallel interfaces (e.g., for printers), serial interfaces, etc., all of which can be used with the present invention.

The microprocessor 20 can communicate with other components of the computer system 12, including a north bridge 26 in the example shown. The north bridge 26 includes integrated circuit chip(s) that connect a microprocessor to memory, to a PCI bus or other system bus, to cache memory, and to other functions. The north bridge 26 is connected to memory 28 which can include Read Only Memory (ROM) and/or Random Access Memory (RAM) of the desired types, allowing the microprocessor to retrieve and store information (other memory such as cache memory can be local to the microprocessor 20). A south bridge 30 can be connected to the north bridge 26 and includes an integrated circuit chip that control I/O functions, such as USB, audio, serial, internal communication buses, etc. The south bridge 30 is in turn connected to a USB host controller 32, which communicates with USB interface devices connected to the computer system 12. Other configurations can be used in alternate embodiments, in which there is no north bridge/south bridge division of functionality, and/or the functions are divided among different components in different ways. Other components may also be coupled to the computer system 12, such as network adapters that enable the computer system to become coupled to other computer systems or devices through intervening private or public networks.

The USB standard is host controlled, and the USB host controller 32 allows the computer system 12 to act as a USB host. The USB host is responsible for undertaking all transactions between the computer system 12 and the USB devices, and for scheduling bandwidth. Data can be sent by various transaction methods using a token-based protocol. USB host controllers have their own specifications; e.g., for USB 1.1, host controller interface specifications include Universal Host Controller Interface (UHCI) and Open Host Controller Interface (OHCI), and for USB 2.0, a specification includes Enhanced Host Controller Interface (EHCI).

The host controller 32 can be connected to a device 14 by a communication link or bus 38. For the USB standard, this link is typically multiple shielded wires that provide both differential data signals (D+ and D−) and power to the USB device 14. The communication between the computer system 12 and device 14 is allowed over any appropriate communication layer, such that link 38 can be provided using transmission wires, wireless communication devices, internal circuits to the computer system 12, or any electronic communication medium and mechanism.

A device 14 can be connected to the host controller 32 of the computer system 12 by link 38. The device 14 can be any of a variety of interface devices or other types of devices. For example, device 14 can be a keyboard, mouse, storage device (hard disk drive, floppy disk drive, etc.), CD-ROM or DVD-ROM drive, modem, scanner, audio speaker, video monitor, printer, cell phone, PDA, or other electronic device or peripheral. In the described embodiment, the device 14 is a USB device 14 including a serial interface engine 40 and digital software logic 42, which can be provided within the housing of the USB device, if applicable, e.g. on one or more integrated circuits.

A serial interface engine (SIE) 40 connects to the USB bus 38. The SIE is a controller that detects when the device 14 is connected to a host controller, receives the power and data signals from the bus and can indicate to the host controller 32 the speed of the USB device (e.g., high or low speed). The SIE typically handles low-level USB protocol details such as error checking and bus retries. Other types of controllers can be used in other embodiments instead of the SIE (e.g., an application-specific integrated circuit (ASIC) connected to a USB transceiver).

Digital software logic 42 is connected to the SIE 40, and can perform any processing required by the USB device 14 and receive any input provided by the user using the device, if applicable (e.g., for a keyboard or mouse device 14). In the present invention, the digital software logic 42 also forwards the communicated data of the USB bus 38 to the management module 16 and receives data from the management module 16 to be provided to the USB device 14 and/or to be forwarded to the computer system 12.

Management module 16 is coupled to the digital software logic 42 by a peripheral bus 44. The management module 16 can be implemented in its own hardware, or be integrated with other hardware in USB device 14 or in computer system 12, depending on the embodiment. For example, the management module 16 can be provided as part of the USB device, and included in the same housing as the device 14 and provided in existing hardware in the device 14, if desired. In other embodiments, the management module 16 is separate from other components of system 10.

The management module 16 can perform a variety of functions, depending on the embodiment of computer system 12 and USB device 14. For example, in some embodiments, the management module 16 can control functions related to multiple computer systems 12 (as described below with respect to the embodiment of FIG. 2). With respect to the present invention, management module 16 includes a virtual device engine 46 and an operating system (OS) detection engine 48. In the described embodiment, the virtual device engine 46 (shown as virtual USB engine 46) runs in software in hardware of the management module 16 and includes logic to emulate the USB device 14 to the operating system 24 of the connected computer system 12. Thus the digital software logic 42 can provide host requests to the management module 16, and the virtual USB engine 46 will respond to the USB host controller 32 back over peripheral bus 44 and USB bus 38 as if it were the actual USB device.

The emulation of virtual engine 46 includes the enumeration of the device 14 to the host controller 32 and responding to requests for data from the operating system 24. For example, when the USB device 14 is connected to the USB bus 38 and to the computer system 12, the device 14 is detected by the host controller 32 and an enumeration of the device is requested by the host controller 32 and/or by operating system 24 to identify the device to the host and provide necessary device characteristics. The enumeration includes various steps that form an enumeration pattern. The enumeration pattern includes host commands to the device 14 and providing data to the host from the device 14 as requested. For example, in a USB enumeration process, an identifier number can be assigned to the device (since there can be multiple devices on a USB bus) and the operating system 24 is informed of the capabilities of the device 14 (input, output, etc) in a Configuration Descriptor. The device also informs the operating system 24 particular identifying information, such as its "name" in a Device Descriptor, which can include vendor identification, product number, version number, and serial number. Other information can also be provided; for example, if the device 14 identifies itself as a human interface device (HID), then the device describes how the data should be interpreted. Enumerations can occur at various times, e.g., upon connecting the device 14 to the computer system 12, or after a reset of the device 14 or components of the computer system 12. For example, a PCI bus in the host computer can be reset by the BIOS running on that host, requiring another enumeration of the device 14, e.g., when the device 14 is a PCI device connected to the PCI bus.

After interrogating a newly-detected USB device and receiving the enumeration, the host controller 32 can communicate the appropriate information to the operating system 24, which runs the appropriate driver software for the device in the operating system. When the USB device 14 is disconnected from the computer system 12, the host will detect the absence of the device and the operating system unloads the driver software.

In some embodiments, a composite or combined USB device 14 can be used, in which multiple USB devices are combined in their control logic and appear as a single device to the USB host controller. The combined device can provide a single enumeration for the multiple USB devices. For example, a combined keyboard and mouse USB device can include a single SIE 40, digital software logic 42, and virtual USB engine 48, and provide signals from both the keyboard and mouse device to the USB host controller.

The emulation provided by the virtual USB engine 48 provides the management module 16 with additional functionality. For example, the module 16 can handle data from multiple USB devices while appearing to be one device to the computer system 12, and/or allow multiple computer systems 12 to share a USB device 14 (as in the embodiment of FIG. 2).

The OS detection engine 48 of the present invention is connected to the virtual USB engine 46 and can detect the identity (type) of the operating system 24 based on the communication of enumeration information by the virtual USB engine 46 to the host controller 32 and operating system 24. Since each type of operating system requires a different enumeration of a device 14, the differences in enumeration are detected by the OS detection engine 48 and the identity of the operating system determined therefrom. The ability of the OS detection engine 48 to detect the operating system 24 is described in greater detail below with respect to FIGS. 3 and 4.

In an alternate embodiment, the management module 16 need not include a virtual device engine 46. For example, the OS detection engine 48 can be provided in the device 14 and be included in, or connected to, the digital software logic 42. In such an embodiment, the digital software logic 42 can provide the enumeration information and responds to enumeration requests from the host controller 32, as in a standard USB device, except that the logic 42 can also send the enumeration pattern to the OS detection engine 48.

It should be noted that in other embodiments, other interfaces besides USB can be used with the present invention. Any interface can be used that requires a device to send information to the host computer indicating the identity, capabilities, and/or status of the device, and which that information varies depending on the operating system running on the host computer, can be used with the present invention similarly to the USB embodiment described herein.

Figure 2:
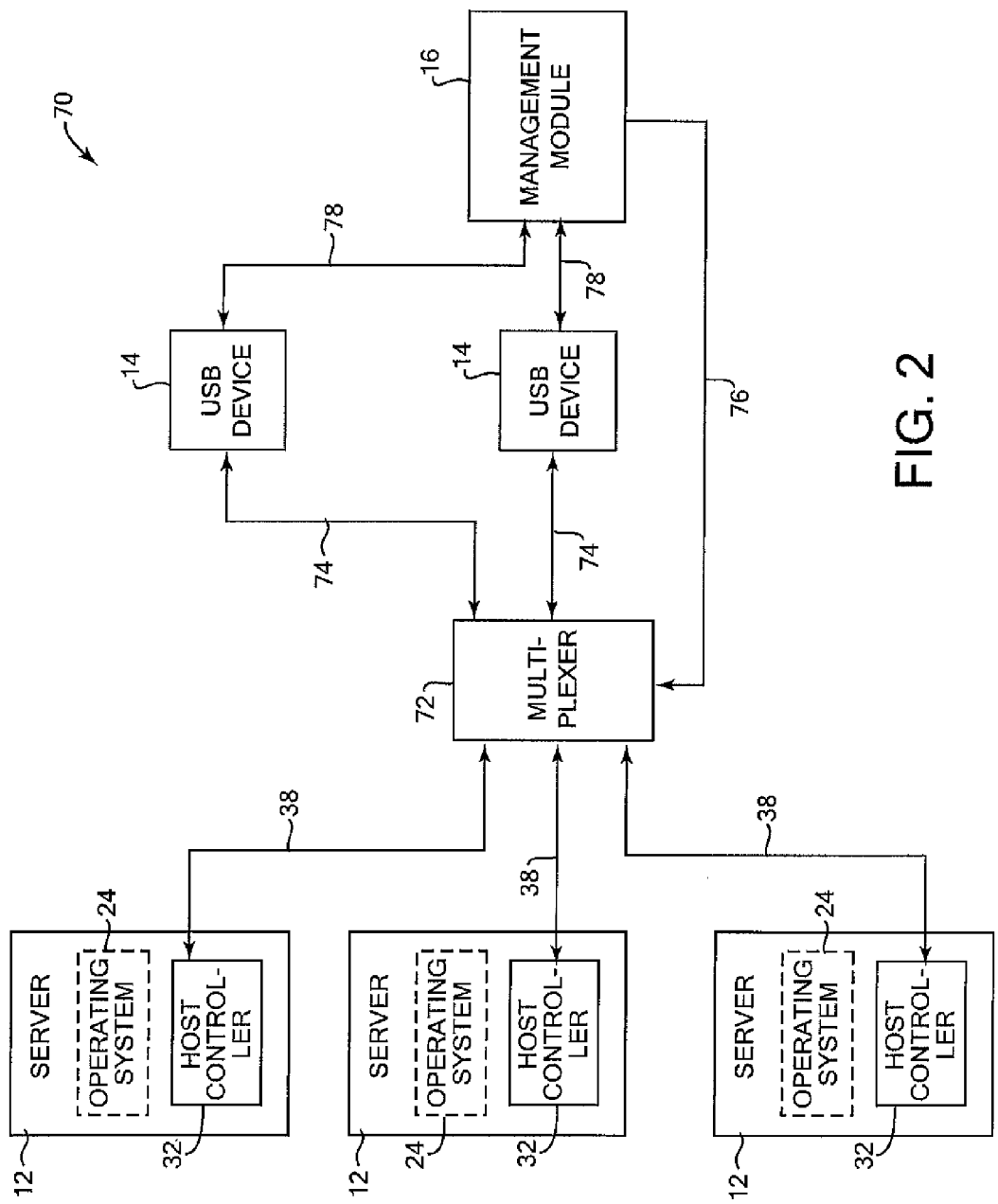
FIG. 2 is a block diagram illustrating an example embodiment for use with the present invention, including a system providing multiple computer systems using one or more devices.

FIG. 2 is a block diagram illustrating an example embodiment 70 for use with the present invention, including a system providing multiple computer systems 12 using one or more devices 14. System 70, for example, can be a blade server system, where each computer system 12 is a server computer or "blade" provided in a common chassis or enclosure which provides a common power supply, cooling, and other components for all the blades.

In the described embodiment, each server 12 is connected to each USB device 14 by a USB communication bus. Devices 14 include the SIE 40 and digital software logic 42 as explained above, as well as the physical hardware used to implement the functions of the device. Other types of devices using other communication standards can be connected in other embodiments.

One or more switches or multiplexers 72 can be used to connect the servers 12 to the USB devices 14. For example, as shown in FIG. 2, each server 12 is connected to multiplexer block 72 by USB bus 38, and each output 74 of the multiplexer block 72 is connected to a USB device 14. The multiplexer block 72 can select a server input to connect to a USB device 14 as desired. To select which server 12 is connected to a particular USB device 14, the management module 16 can control the multiplexer block 72 using a control line 76. For example, multiplexer block 72 can be implemented as multiple multiplexers, each multiplexer receiving the USB bus 38 from the servers 12 and providing an output 74 to its associated USB device 14, and each multiplexer in block 72 receiving a control signal on the control line 76 from the management module 16 to select the server 12 connected to the associated USB device 14.

The management module 16 includes a virtual USB engine 46 and an OS detection engine 48 as described above with reference to FIG. 1. The management module 16 is coupled to the available USB devices 14 using appropriate connections, e.g., network connections 78 (such as a USB over IP protocol, or other suitable protocol). The virtual USB engine 46 on the management module 16 can emulate a USB device and via the appropriate USB device 14 responds to appropriate signals from one or more of the servers 12 so that any of servers 12 connecting to the management module 16 will act as though connected to the USB device 14.

When one server 12 is disconnected from a USB device 14 and another server 12 is connected to the USB device, the operating system 24 of the newly-connected server 12 can start an enumeration process for the newly-detected USB device 14 (while the operating system of the disconnected server 12 can unload the drivers for the device 14, etc.). The OS detection engine 48 of the management module would then detect the operating system of the newly-connected server 12 after enumeration. The management module 16, using the virtual USB engine 46, can also allow multiple servers to share access to a USB device 14, where each server 12 believes it has sole access to that USB device.

Figure 3:
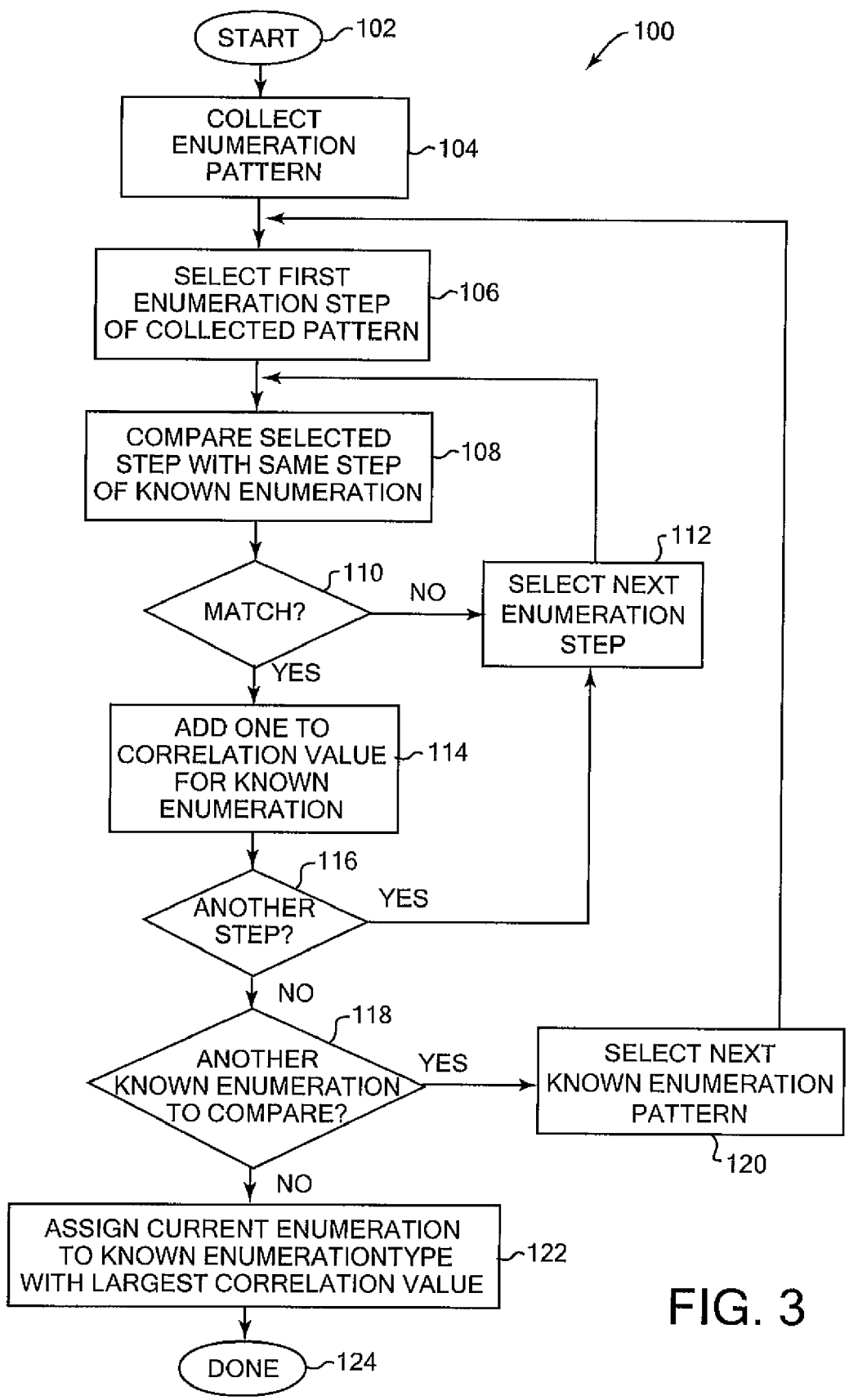
FIG. 3 is a flow diagram illustrating one embodiment of a method of the present invention for identifying an operating system based on device enumeration information.

FIG. 3 is a flow diagram illustrating one embodiment 100 of a method of the present invention for identifying an operating system based on device enumeration information. Method 100 can use a "fuzzy logic" procedure to find the known enumeration pattern that best matches a collected enumeration pattern. Method 100 can be implemented, for example, by the OS detection engine 48. Method 100 can be implemented by program instructions or code, which can be stored on a computer readable medium. Alternatively, the method 100 can be implemented in hardware (logic gates, etc.), or in a combination of hardware and software.

The method begins at 102, and in step 104, an enumeration pattern is collected. In the embodiments described above, this is performed when the OS detection engine 48 receives from the virtual device engine 46 the enumeration pattern that was provided by the virtual device engine 46 to the host controller 32. The actions taken and the data provided during the enumeration are provided as a pattern to the OS detection engine 48, where the pattern describes the steps that were taken during the enumeration.

For example, if the operating system 24 of the computer system 12 is a WINDOWS® operating system, then an enumeration pattern including the following steps is typically performed for a USB device, once the host has detected the device: 1) the host issues a reset, placing the device in the default state; 2) the host asks for the Device Descriptor stored in the USB device, and receives the first 8 bytes of the Device Descriptor from the device; 3) the host issues another reset; 4) the host requests and receives all the bytes of the Device Descriptor; 5) the host requests and receives the Configuration Descriptor from the device; and 6) the host asks for String Descriptors, if any were specified.

If the operating system 24 is, for example, a LINUX® operating system, then an enumeration pattern including the following steps is typically performed for a USB device, after detecting the device: 1) the host issues a reset to the device; 2) the host requests and receives 16 bytes of the Device Descriptor from the device; 3) the host requests and receives all the bytes of the Device Descriptor; and 4) the host requests and receives the Configuration Descriptor from the device. Similarly, other operating system types will have USB enumeration patterns specific to that type of operating system. When a device is enumerated for a BIOS running on the host computer system, a first enumeration can be under BIOS, while a second enumeration can then be under another operating system also running above the BIOS on the host computer system (although this enumeration order need not always occur).

Thus the elements in an enumeration pattern include resetting the device, getting Device Descriptor bytes, getting Configuration Descriptor bytes, and getting String Descriptors or numbers. Other steps may include setting the device to be idle, getting a maximum logical unit number (a USB mass storage command sent by the operating system to find out how many mass storage devices are associated with a particular interface), etc.

When a device uses other communication protocols or standards, other enumeration pattern steps are used. For example, when communicating with a SCSI hard disk drive, the enumeration pattern steps can include communicating SCSI commands, such as test unit ready, inquiries, read and write commands, read capacity (of the drive), and read format capacity (of the drive). Other commands are used with other types of devices, such as Intelligent Drive Electronics (IDE) interface devices, Firewire device, etc., which can similar provide an enumeration pattern to the OS detection engine 48.

In step 106, the first enumeration step of the collected enumeration pattern is selected. In step 108, the selected step is compared with the same step of a known enumeration pattern. For example, the first enumeration step can be compared to the first step of the enumeration pattern used with the WINDOWS® operating system, which is a "reset device" step as described above. If the third step of the collected enumeration has been selected, it can be compared with the third step of the WINDOWS® operating system enumeration pattern (another "rest device" step in the example described above).

In step 110, the process checks whether there is a match between the selected enumeration step and the same step of the known enumeration pattern. If there is no match, then the process continues to step 112, in which the next enumeration step of the collected pattern is selected, and the process returns to step 108 to compare that selected step to the same step of the known enumeration pattern.

If there is a match at step 110, then the process continues to step 114, in which a value of one is added to a correlation value for the known enumeration. The correlation value is a value associated with the known enumeration type that is currently being compared in the process 100; each known enumeration type is provided with an associated correlation value that indicates the degree to which it matches the collected enumeration pattern.

In step 116, the process checks whether there is another step in the collected enumeration pattern to compare. If so, then the process continues to step 112 where the next enumeration step is selected, and the process returns to step 108 to compare the selected step with the same step of the known enumeration pattern. If at step 116 it is determined that there are no further steps in the collected enumeration pattern to compare, then process continues to step 118, where the process checks whether there is another known enumeration pattern of another operating system type to compare to the collected pattern. For example, if a WINDOWS® operating system known enumeration pattern was already compared, then another known enumeration pattern to compare may be a LINUX® operating system enumeration pattern. If there is another known enumeration to compare, then the process continues to step 120, where the next known enumeration pattern is selected, and the process returns to step 106 to select the first enumeration step of the collected pattern similarly as described above (except that the comparing of step 108 is with the newly-selected known enumeration pattern).

If there are no more known enumeration patterns to compare when checked at step 118, then the process continues to step 122, in which the current (collected) enumeration pattern is assigned to the known enumeration that has the largest correlation value. The largest correlation value was accumulated for a known enumeration pattern based on the greatest number of matching enumeration steps between the current pattern and the known pattern. The operating system type associated with the known pattern having the largest correlation value is thus selected as the identified operating system 24 of the host computer system 12. The process is then complete at 124.

It should be noted that other methods can be used in other embodiments to determine the highest correlation value, or otherwise determine which known enumeration pattern corresponds most closely to the collected pattern. For example, different values than one can be added or subtracted from the correlation value.

A threshold correlation value requirement can also be used in some embodiments in order to make an operating system identification. For example, the largest correlation value must be more than the next largest correlation value by at least a threshold amount in order for the operating system type to be identified. If the threshold is not met, then the method can provide an "unknown operating system" result.

In some embodiments, additional categories related to the operating system identity can also be identified by method 100. For example, different versions or updates of an operating system can be detected if the enumeration patterns used by the different versions are different. Thus, for example, if a service pack installation for the WINDOWS® operating system changed the enumeration pattern used by the operating system, the method 100 above can be provided with known enumeration patterns for the WINDOWS® operating system version with service pack, and the version without service pack, and can compare the collected pattern to each known pattern. Similarly, a known enumeration pattern can be provided and compared to the collected pattern for one kernel version of LINUX® operating system, and one provided and compared for a different kernel version of LINUX® operating system.

Figure 4:
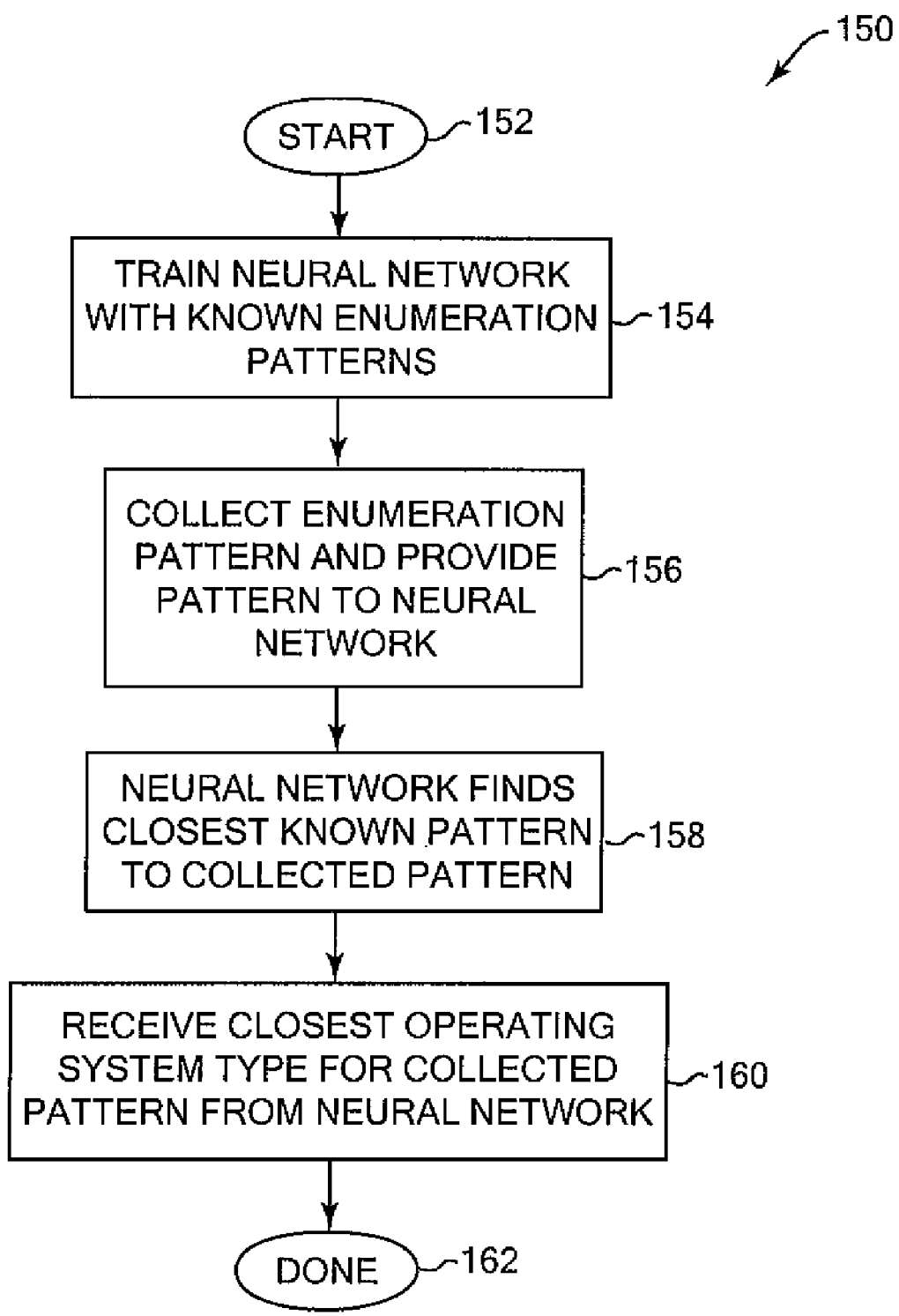
FIG. 4 is a flow diagram illustrating another embodiment of a method of the present invention for identifying an operating system based on device enumeration information.

FIG. 4 is a flow diagram illustrating another embodiment 150 of a method of the present invention for identifying an operating system based on device enumeration information. In this embodiment, an artificial neural network, implemented in software (and/or hardware), is used to correlate a current enumeration with a known enumeration pattern based on training that the neural network has previously received. The neural network can be provided in the OS detection engine 48, for example.

The method starts at 152, and in step 154, the neural network is trained with known enumeration patterns. The enumeration patterns for all the types of operating systems that are desired to be identified are provided to the neural network as examples so that the neural network can learn which patterns to compare and weight various pattern steps according to categories. Such training is well known to those skilled in the art of neural networks.

In step 156, an enumeration pattern is collected from the current enumeration of the device to the host computer as described above, and the collected pattern is provided to the neural network. In step 158, the neural network finds the closest known enumeration pattern to the collected enumeration pattern. For example, the neural network can use numerically-based pattern recognition, as is well known to those of skill in the art, to determine the closest known enumeration pattern to the collected enumeration pattern.

In step 160, the output of the neural network is received, for example, as the identified operating system type that is associated with the closest known enumeration pattern found in step 158. The process is then complete at 160. Alternatively, the neural network can provide the closest known enumeration pattern, which is then associated with an operating system type and/or version.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for identifying an operating system running on a computer, the method comprising:

collecting an enumeration pattern describing an enumeration of a device that has been performed between the device and the operating system running on a host computer system, wherein the enumeration pattern does not explicitly identify the operating system; and identifying the type of the operating system running on the host computer system based on the collected enumeration pattern;

wherein identifying the type of the operating system is based on a comparison of the collected enumeration pattern with at least one known enumeration patterns associated with different types of operating systems; wherein the comparison of the collected enumeration pattern with known enumeration patterns includes comparing a plurality of steps of the collected enumeration pattern to a plurality of steps in the known enumeration patterns, such that the known enumeration pattern having the highest correlation of steps to the collected enumeration pattern is selected for identifying the type of operating system.

2. The method of claim 1 wherein identifying the type of the operating system includes inputting the collected enumeration pattern to a neural network that has been trained with known enumeration patterns associated with different types of operating systems.

3. The method of claim 1 wherein the enumeration includes the host computer system requesting and receiving enumeration information from the device and providing commands to the device.

4. The method of claim 1 wherein the enumeration pattern is collected from a virtual device engine that emulates the operation of the device to at least one host computer system.

5. The method of claim 4 wherein the virtual device engine is operative to receive information from at least one additional host computer system connected to the device.

6. The method of claim 5 wherein the operating system identification and virtual device engine are provided in a management module operative to receive information from a plurality of host computer systems and connected to a plurality of devices.

7. The method of claim 1 wherein the device communicates with the host computer using one of the standard protocols including USB, SCSI, and IDE.

8. The method of claim 1 wherein the identifying the type of the operating system includes identifying a version of the operating system.

9. The method of claim 1 wherein the device is a USB device and wherein the host computer system includes a USB host controller.

10. The method of claim 1 wherein identifying the type of the operating system is based on a comparison of the collected enumeration pattern with at least one known enumeration pattern associated with a particular type of operating system.

11. The method of claim 1 wherein for each step in a sequence in the collected enumeration pattern, the step is compared to a step in an equivalent place to the step in a sequence in the known enumeration patterns.

* * * * *